(12) United States Patent
Fujikami et al.

(10) Patent No.: US 6,313,408 B1
(45) Date of Patent: Nov. 6, 2001

(54) HIGH TC SUPERCONDUCTING CABLE CONDUCTOR EMPLOYING OXIDE SUPERCONDUCTOR

(75) Inventors: Jun Fujikami; Kenichi Sato, both of Osaka; Tsukushi Hara; Hideo Ishii, both of Chofu, all of (JP)

(73) Assignees: Sumitomo Electric Indusstries, Inc; The Tokyo Electric Power Company, Incorporated, both of (JP)

( * ) Notice: Subject to any disclaimer, the term of this patent is extended or adjusted under 35 U.S.C. 154(b) by 1134 days.

(21) Appl. No.: 08/766,984

(22) Filed: Dec. 16, 1996

Related U.S. Application Data

(63) Continuation of application No. 08/238,128, filed on May 4, 1994, now abandoned.

(30) Foreign Application Priority Data

May 7, 1993 (JP) .................................................. 5-106553

(51) Int. Cl.[7] .................................................. H01B 12/00

(52) U.S. Cl. ...................... 174/125.1; 174/15.4; 505/230; 505/231; 505/234; 505/431

(58) Field of Search .................................. 174/15.4, 15.5, 174/125.1; 505/230, 231, 234, 430, 431, 704, 740, 884, 887

(56) References Cited

U.S. PATENT DOCUMENTS

| | | | |
|---|---|---|---|
| 4,031,310 | 6/1977 | Jachimowicz | 174/15.6 |
| 4,265,932 | 5/1981 | Peters et al. | 427/582 |
| 4,883,922 | * 11/1989 | Yokota et al. | 174/125.1 |
| 5,017,277 | 5/1991 | Yoshida et al. | 204/298.02 |
| 5,276,281 | * 1/1994 | Sato et al. | 174/125.1 X |

FOREIGN PATENT DOCUMENTS

| | | | |
|---|---|---|---|
| A-0 235 522 | 1/1987 | (EP) | . |
| 0 329 179 | 2/1989 | (EP) | . |
| A-0 412 442 | 2/1991 | (EP) | . |
| 2 231 587A | 11/1990 | (GB) | . |
| 0207419 | * 8/1990 | (JP) | 505/740 |
| 4-277410 | * 10/1992 | (JP) | 174/125.1 |

OTHER PUBLICATIONS

Patent Abstracts of Japan, vol. 17, No. 525, Sep. 21, 1993 and abstract of JP–A–05 144333, Jun. 11, 1993.
Patent Abstracts of Japan, vol. 18, No. 155, Mar. 15, 1994 and abstract of JP–A–05 334921.

(List continued on next page.)

*Primary Examiner*—Albert W. Paladini
(74) *Attorney, Agent, or Firm*—Pennie & Edmonds LLP

(57) ABSTRACT

Provided is an insulated oxide superconducting cable conductor having a high critical current and a high critical current density. The insulated oxide superconducting cable conductor comprises an elongated former, a plurality of tape-shaped multifilamentary oxide superconducting wires which are wound on the former at a bending strain factor of not more than 0.5%, and a spirally wound tape-shaped insulating material covering the tape-shaped multifilamentary oxide superconducting wires. The tape-shaped multifilamentary superconducting wires are superposed on the former in layers, whereby stabilizing materials of the superposed superconducting wires are in contact with each other. The tape-shaped insulating material consists essentially of a material which is contracted at a thermal contraction rate of at least three times that of the tape-shaped multifilamentary wires by cooling from a temperature of 298 K to that of 77 K. The tape-shaped insulating material can apply a pressure to the superposed multifilamentary superconducting wires toward the former while improving electrical contact between the superposed multifilamentary superconducting wires by cooling in employment. The former can be formed of a flexible tube.

9 Claims, 5 Drawing Sheets

OTHER PUBLICATIONS

Sutton, "Induced circumferential currents and losses in flexible superconducting cables", Cryogenics, pp. 541–545, Sep., 1975.

Appl. Phys. A 48, 527–542 (1989), "Laser–Induced Formation and Surface Processing of High–Temperature Superconductors", by D. Bauerle.

Appl. Phys. Lett. 52 (25), Jun. 1988, "Plasma emission from laser ablation of the hgih–temperature superconductor $YBa_2Cu_3O_7$", by Wayne A. Weimer.

J. Appl. Phys. 67(8), Apr. 1990, "Optical emission spectroscopy during sputtering of Y–Ba–Cu–oxide targets", by C.B. Fleddermann.

* cited by examiner

HIGH TC SUPERCONDUCTING CABLE CONDUCTOR EMPLOYING OXIDE SUPERCONDUCTOR

This is a continuation, of application Ser. No. 08/238, 128, filed May 4, 1994, now abandoned.

BACKGROUND OF THE INVENTION

1. Field of the Invention

The present invention relates to an high Tc (Critical Temperature) superconducting cable conductor employing an oxide superconductor, and more particularly, it relates to an insulated superconducting cable conductor having flexibility, which is applicable to a superconducting cable.

2. Description of the Background Art

In relation to an oxide superconductor which enters a superconducting state at the liquid nitrogen temperature, expected is application to a superconducting cable with a cooling medium of liquid nitrogen. When such application is implemented, it may be possible to simultaneously attain simplification of a thermal protection system and reduction of a cooling cost, which are necessary for a metal superconducting cable requiring high-priced liquid helium.

A number of superconducting cables have been prepared from metal superconductors, followed by increasing study of insulating materials therefor. In relation to such insulating materials, the dielectric breakdown characteristic, the dielectric characteristic and the insulating life are taken into consideration on the premise that the same are not cracked under cooling temperatures. In relation to a metal superconducting cable, however, it has not been particularly necessary to consider influence exerted on the critical current by an insulating material as employed, since a metal superconductor has relatively high mechanical strength and exhibits an extremely high critical current density at the liquid helium temperature in a state with no application of a magnetic field.

In an oxide superconducting wire such as a bismuth based oxide superconducting wire which is stabilized by silver, the critical current density at the liquid nitrogen temperature is about ⅟10 that at the liquid helium temperature at present. In the oxide superconducting wire, therefore, influence exerted on the critical current by the insulating material is more significant as compared with that in the metal superconductor. Further, an oxide superconducting wire containing ceramics is inferior in resistance against mechanical strain as compared with the metal superconducting wire. When an oxide superconducting wire is subjected to remarkable bending in preparation of a cable, for example, its critical current may be extremely reduced.

SUMMARY OF THE INVENTION

An object of the present invention is to provide an insulated oxide superconducting cable conductor which is excellent in superconductivity with a high critical current and a high critical current density, in particular.

Another object of the present invention is to provide an insulated oxide superconducting cable conductor having flexibility.

According to the present invention, provided is an insulated superconducting cable conductor having a plurality of tape-shaped multifilamentary oxide superconducting wires, which comprises an elongated former, the plurality of tape-shaped multifilamentary oxide superconducting wires spirally wound on the former at a bending strain in a prescribed range, and a tape-shaped insulating material spirally wound on the superconducting wires. In this insulated superconducting cable conductor, the tape-shaped multifilamentary oxide superconducting wires are superposed on the former in layers, so that stabilizing materials of the superposed tape-shaped multifilamentary superconducting wires are in contact with each other. The tape-shaped insulating material consists essentially of a material which is contracted at a thermal contraction rate of at least three times that of the tape-shaped multifilamentary superconducting wires by cooling from room temperature to liquid nitrogen temperature. Thus, the tape-shaped insulating material can supply a pressure from itself to the superposed tape-shaped multifilamentary superconducting wires toward the former by cooling in employment so that electrical contact between the superposed tape-shaped multifilamentary superconducting wires can be improved by cooling in employment.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
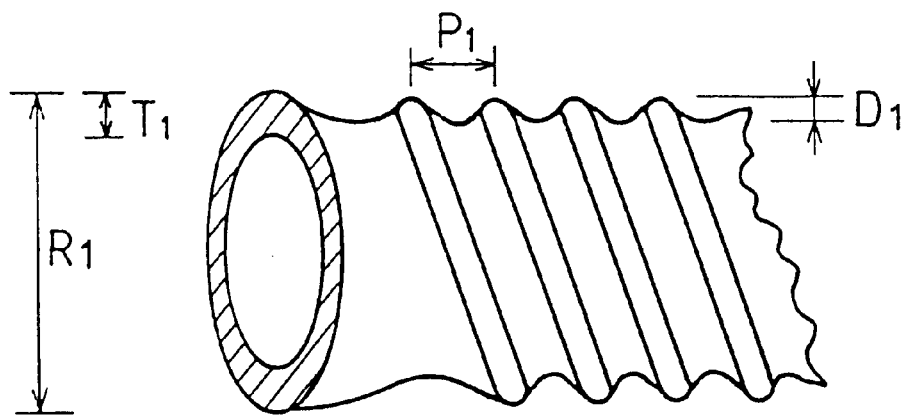
FIG. 1 illustrates a part of a spiral former which is employed in the present invention.

According to the present invention, each tape-shaped oxide superconducting multifilamentary wire generally has such a structure that a number of filaments consisting essentially of an oxide superconductor are embedded in a stabilizing material of silver or a silver alloy. The oxide superconductor is prepared from a yttrium, bismuth or thallium based oxide superconductor, for example. A bismuth based ceramics superconductor is preferable in consideration of a high critical temperature, a high critical current density, low toxicity and easiness in working into a wire. Each tape-shaped superconducting wire is generally prepared through processes of preparing raw material powder for an oxide superconductor, charging the powder in a stabilizing material sheath, performing plastic working on the sheath, and sintering the same. In preparation of the raw material powder, powder materials of oxides or carbonates of elements forming a superconductor are mixed with each other at prescribed blending ratios and sintered, and thereafter the sintered body is crushed to obtain the raw material powder. The sheath to be charged with this powder consists essentially of silver or a silver alloy, for example. The plastic working step is carried out through drawing and rolling. After the rolling, the wire which is shaped into a tape is sintered at a temperature of about 800° C. to about 900° C., preferably at about 840° C. to 850° C., so that the superconductor charged in the sheath attains high orientation and a high critical current density. When a multifilamentary wire is prepared, a plurality of wires obtained by drawing are combined with each other and subjected to plastic working and sintering. In the aforementioned processes, it is possible to form a substantially single superconducting phase having high orientation, due to combination of the plastic working and the sintering. The filaments of the tape-shaped superconducting wire prepared through the aforementioned processes have a substantially homogeneous superconducting phase along the longitudinal direction of the tape wire, while the c-axes of the superconducting phase are oriented substantially in parallel with the thickness direction of the tape wire. Further, crystal grains in the filaments are in the form of flakes extending along the longitudinal direction of the tape wire, and strongly bonded to each other. The flake-shaped crystal grains are laminated along the thickness direction of the tape wire. The tape-shaped superconducting wire as employed is not particularly restricted in size, while the same is generally 1.0 mm to 10 mm, preferably 2 mm to 6 mm in width, and 0.05 mm to 1 mm, preferably 0.1 mm to 0.4 mm in thickness. In such dimensions, the tape wire having the filaments of the aforementioned structure can maintain a critical current density of about $4 \times 10^3$ to about $3.0 \times 10^4$ A/cm$^2$, for example. The tape wire having the filaments of the aforementioned structure is relatively resistant against bending, and maintains a high critical current density also when the same is held in a bending strain within a specific range, as described later. The tape-shaped multifilamentary wire can be provided with 7 to 10,000, preferably 37 to 1,000 filaments.

In the wire according to the present invention, the former is adapted to hold the tape-shaped superconducting wires at a bending strain in a prescribed range. The former has a length which is required for the insulated superconducting cable conductor, and is provided at the center of the conductor. The former is substantially in a cylindrical or spiral shape, in order to receive the tape-shaped wires. The former generally has a substantially constant diameter along its overall length. The former can consist essentially of at least one material selected from the group consisting of stainless steel, copper, aluminum and FRP (fiber-reinforced plastic).

Figure 2:
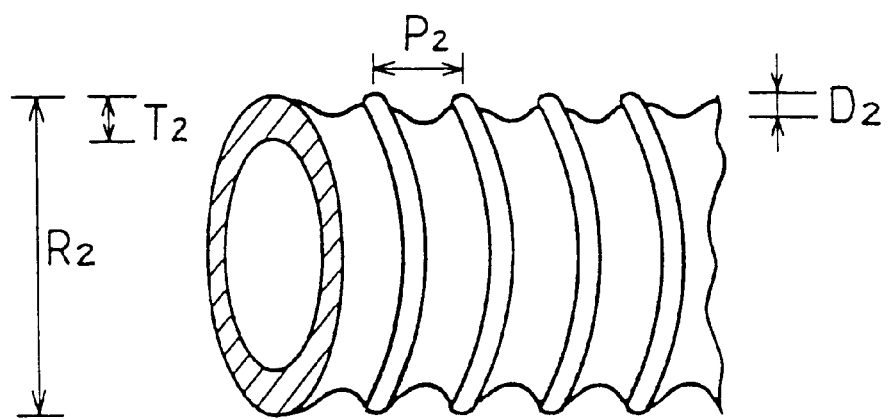
FIG. 2 illustrates a part of a bellows tube type former which is employed in the present invention
Figure 3:
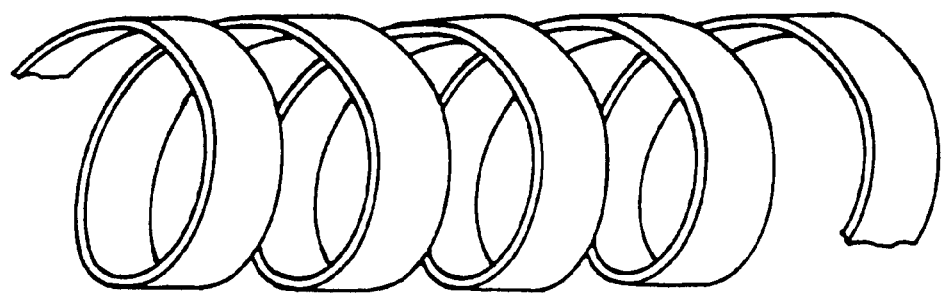
FIG. 3 illustrates a part of another spiral former employed in the present invention.

According to the present invention, the former is preferably formed by a flexible tubular member. A spiral tube on which a material-forming the former is spirally wound as shown in FIG. 1, for example is preferably employed, as a former having sufficient strength and flexibility. Alternatively, a bellows tube is also preferably employed as a former as shown in FIG. 2. Additionally, a spiral member such as a spiral steel strip as shown in FIG. 3 is preferably used as the former. Each of these shapes supplies the former with flexibility. Such a spiral or bellows tube can also be made of stainless steel, copper, aluminum or FRP. The former having flexibility supplies flexibility to the present conductor. The conductor having flexibility can be taken up on a drum.

According to the present invention, several 10 to 1,000 tape-shaped multifilamentary superconducting wires can be wound on the former. At least two layers, preferably at least three layers of the tape wires are wound on the former so that principal surfaces thereof are directed to the former. Each layer may be formed by an arbitrary number of the tape wires. When several 10 tape wires are wound on the former in parallel with each other so that the surface of the former is filled up with the tape wires, then several 10 tape wires are further wound thereon. When a sufficient number of the tape wires are wound on the first layer to form a second layer, tape wires forming a third layer are further successively wound thereon. A multilayer structure is thus formed. It is preferable to reverse winding directions between adjacent layers, in order to improve contact between the tape wires after insulation. When the tape wires are wound in layers, the tape wires of adjacent layers are in contact with each other. Namely, the stabilizing materials of the tape wires are in contact with each other.

Figure 4:
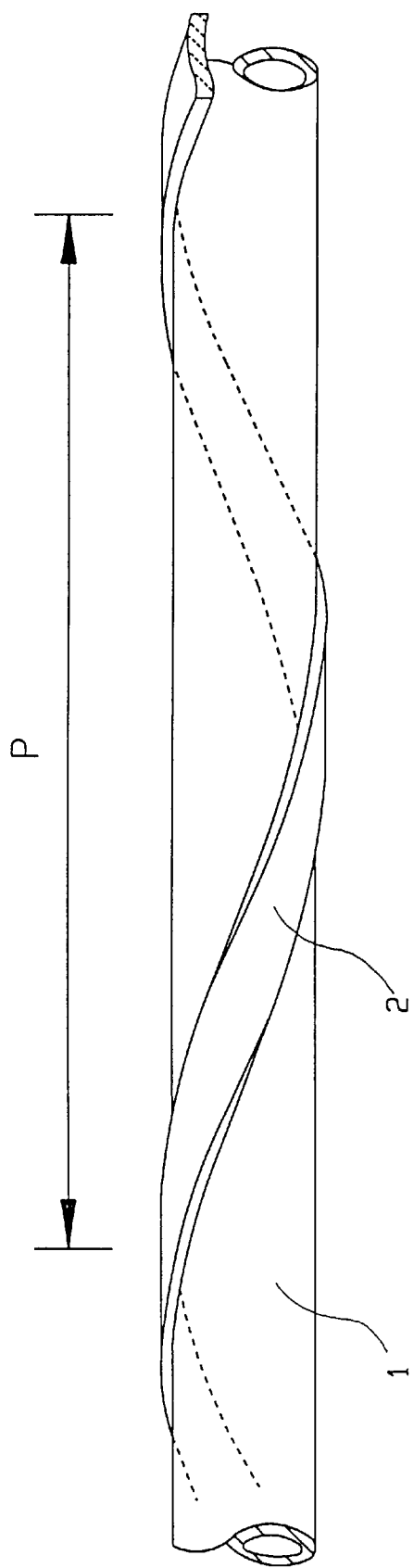
FIG. 4 typically shows a tape-shaped multifilamentary wire which is spirally wound on a former.

According to the present invention, each tape-shaped multifilamentary oxide superconducting wire is wound on the former as shown in FIG. 4, for example. Referring to FIG. 4, a tape wire 2 is wound on a former 1 having a prescribed diameter at a bending strain or a curvature in a prescribed range, and a pitch (P) in a prescribed range. At this time, a principal surface of the tape wire 2 is directed to the former 1. Therefore, the tape wire 2 is gently bent along its length. When the bending strain factor is defined as follows, a tape wire wound on the former is preferably bent at a bending strain factor of not more than 0.5%, more preferably not more than 0.3%:

Bending Strain Factor (%)=(Wire Thickness/Bending Diameter)×100

The tape wire bent at a bending strain factor within these ranges is not much deteriorated in superconductivity as compared with that in a linear state.

The superconducting tapes which are wound on the former in layers are covered with the tape-shaped insulating material. The tape-shaped insulating material is preferably made of a material which is contracted at a thermal contraction rate larger than those of the former and the tape wires. When the rate of thermal contraction caused by cooling in employment is defined as follows, the tape-shaped insulating material is made of a material which can be contracted by cooling at a thermal contraction rate of at least three times, preferably at least five times or more preferably at least ten times that of the tape-shaped multifilamentary superconducting wires:

$$\text{Thermal Contraction Rate}(\%) = \left(1 - \frac{\text{Volume of Material at 77 K.}}{\text{Volume of Material at 298 K.}}\right) \times 100$$

Such a material is prepared from at least one material selected from the group consisting of polypropylene laminate paper (PPLP), paper such as craft paper, polyethylene such as a polyethylene film, and combination thereof. For example, a silver-stabilized bismuth based oxide superconducting wire is contracted at the rate of about 0.2% when the same is cooled from the room temperature to the liquid nitrogen temperature, while the aforementioned materials exhibit the contraction rate of at least 1%. Another organic resin which exhibits a proper contraction rate by cooling can also be employed as the insulating material according to the present invention. The range of the contraction rate of the insulating material can be set at 0.6 to 5%, preferably 1 to 3%, in correspondence to 3 to 25 times, preferably 5 to 15 times that of the tape-shaped superconducting wires. The insulating tape presses the laminated superconducting tapes toward the former by contraction in cooling. A plurality of tape-shaped insulating materials can be wound on the superconducting tapes in layers. The insulating tapes wound in layers can efficiently apply a pressure toward the former by contraction following cooling. On the other hand, the insulating tape can be wound on the superconducting tapes at prescribed gaps, in order to maintain excellent flexibility of the insulated superconducting cable conductor. The gap defined by the first-layer tape is covered with the second and subsequent tapes. According to the present invention, each tape-shaped insulating material is preferably wound with tension in a range of 0.5 to 2 kgf, for example. On the other hand, the superconducting tapes can be wound with tension in a range of 0.5 to 2 kgf, for example. Winding the insulating tapes with tension in this range can supply an effective pressure to the superconducting tapes by contraction in cooling.

Figure 5:
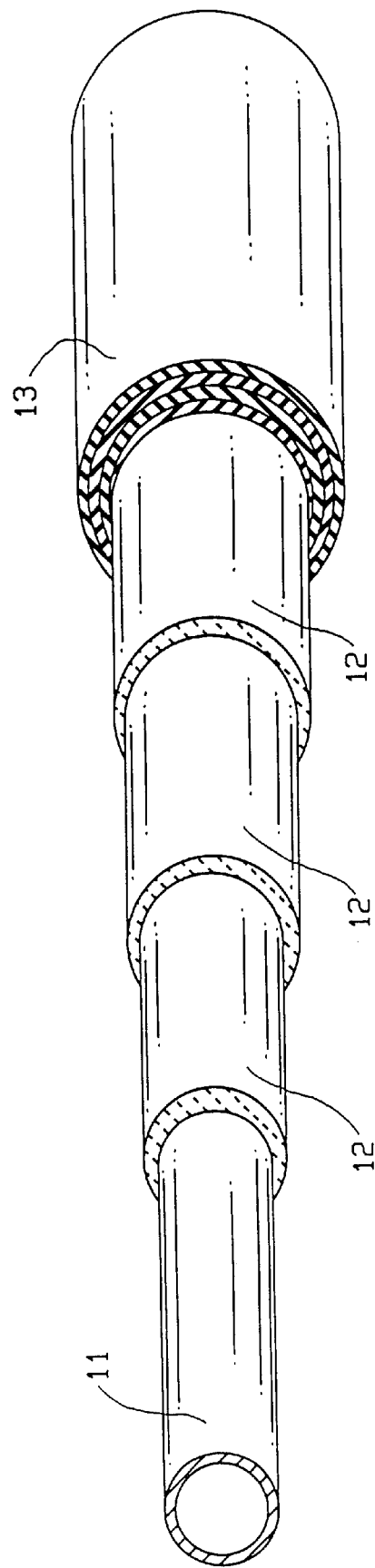
FIG. 5 typically shows the structure of a concrete example of an insulated superconducting cable conductor according to the present invention.
Figure 6:
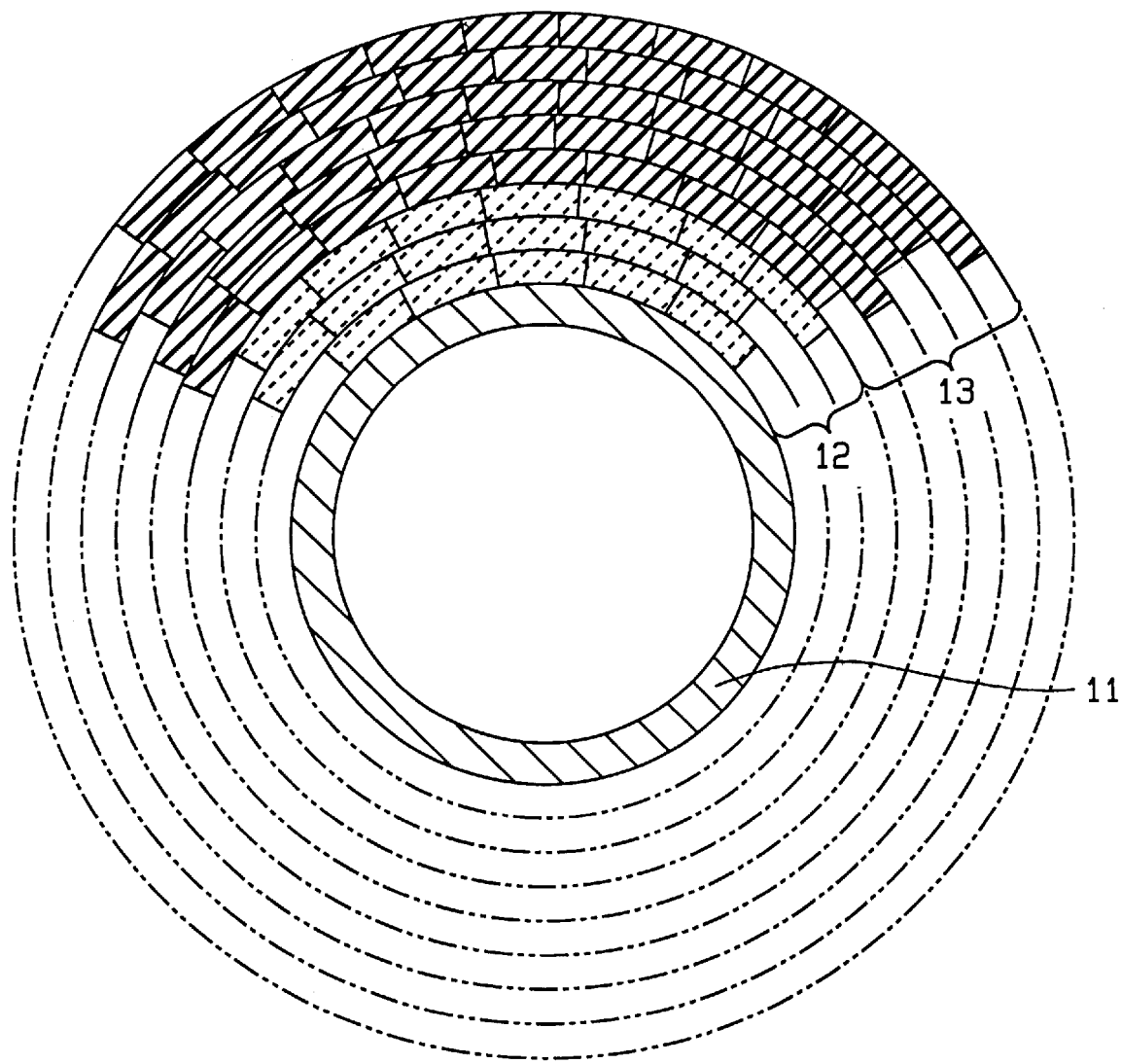
FIG. 6 typically shows a multilayer structure of strands and insulating materials in the superconducting cable conductor shown in FIG. 5.

Referring to FIG. 5, an insulated superconducting cable conductor according to the present invention has a former 11, which is a flexible tube, for example, as a core. Multifilamentary oxide superconducting tapes 12 are spirally wound on the former 11. The tapes 12 are superposed in three layers as shown in FIG. 5, for example. Winding directions of the tapes 12 are reversed between adjacent layers. The stabilizing materials of the tapes 12 are in contact with each other at least between adjacent layers. Insulating tapes 13 are spirally wound on the third-layer superconducting tapes 12. The insulating tapes 13 are also superposed in layers. While FIG. 4 shows the respective parts in an exposed manner for the purpose of illustration of the inventive structure, the former 11 is covered with the superconducting tapes 12, and the superconducting tapes 12 are covered with the insulating tapes 13 in practice, as shown in FIG. 5. The superconducting tapes 12 are superposed on the former 11 in three layers, and the insulating tapes 13 are superposed thereon.

As hereinafter described, it has been demonstrated that a higher critical current value (Ic) can be obtained when the insulating tapes are covered with a material which is contracted at a high contraction rate in cooling, as compared with a case of winding the superconducting tapes on the former with no insulation. It has been estimated that this is because adhesion of the superposed superconducting tapes is improved by contraction of the insulating material. Even if small resistance is caused in a portion of a plurality of superconducting tapes, a current flowing through the portion can be immediately transferred to other superconducting tapes which are in superconducting states, when the superposed superconducting tapes strongly contact with each other. Thus, occurrence of resistance is suppressed in the overall superconducting tapes which are superposed in layers. When oxide superconducting wires having loose transposition between superconducting phases and normal conducting phases are employed, suppression of resistance by such a mechanism is effective. A conductor in which occurrence of resistance is suppressed between superconducting tapes is particularly suitable for an insulated superconducting cable conductor for dc use. On the other hand, it is conceivable that such a mechanism is not much effective for suppression of resistance in a metal superconductor having sharp transposition between superconducting and normal conducting phases. The present conductor suppressing occurrence of resistance has higher stability and safety.

The present invention is now described in more concrete terms.

Study on Bending Strain of Superconducting Tapes wound on Former.

Oxides or carbonates were mixed to prepare powder containing Bi, Pb, Sr, Ca and Cu in the composition ratio of 1.84:0.36:1.99:2.18:3.00. This mixed powder was heat treated and ground to obtain powder containing 85% of a 2212 phase and 15% of a 2223 phase as superconducting phases while containing $(Ca, Sr)_2PbO_4$ and $Ca_2CuO_3$ as non-superconducting phases. The treated powder was charged in a silver pipe of 12 mm in outer diameter and 9 mm in inner diameter, which in turn was drawn into 1.3 mm in diameter. Prescribed numbers of the obtained strands were charged in silver pipes of prescribed sizes as shown in Table 1, and the silver pipes were drawn into 1.0 mm in diameter and then rolled into 0.30 mm in thickness. Then, the obtained wire was heat treated at 845° C. for 55 hours, and thereafter rolled at a draft of 15%. Then, the tape wire was heat treated at 838° C. for 48 hours. In the aforementioned processes, six types of tape-shaped superconducting wires were obtained as shown in Table 1. As to these tape wires of proper lengths, critical current densities (Jc) under the liquid nitrogen temperature were measured in both of linear states and in states bent in prescribed diameters. Table 2 shows results of the critical current densities (Jc) measured with respect to five bending strain factors. When bending strain is applied, reduction of the critical current density is reduced as the percentage of the thickness of the superconductor with respect to that of the wire is reduced. The percentage is preferably not more than 10%. The number of filaments is preferably at least 37. In a superconducting tape having at least 61 filaments, the critical current density is not much reduced with respect to bending strain of 0.5%. It is clearly understood that a multifilamentary superconducting wire prepared according to the aforementioned process can be preferably maintained at a bending strain not more than 0.5% in practice.

TABLE 1

| No. | Numbers of Bundled Strands | Silver Pipe Size (mm) Outer Diameter | Silver Pipe Size (mm) Inner Diameter | $\frac{\text{Superconductor Thickness}}{\text{Wire Thickness}} \times 100(\%)$ |
|---|---|---|---|---|
| 1 | 169 | 26 | 19.5 | 4.0 |
| 2 | 91 | 19 | 14.3 | 5.4 |
| 3 | 61 | 15.6 | 11.7 | 6.6 |
| 4 | 37 | 12 | 9.0 | 8.6 |
| 5 | 19 | 8.7 | 6.5 | 12 |
| 6 | 7 | 5.2 | 3.9 | 20 |

TABLE 2

| No. | 255 mmφ A | 255 mmφ B | 128 mmφ A | 128 mmφ B | 85 mmφ A | 85 mmφ B | 64 mmφ A | 64 mmφ B | 25 mmφ A | 25 mmφ B |
|---|---|---|---|---|---|---|---|---|---|---|
| 1 | 0.1 | 1.50 (100) | 0.2 | 1.50 (100) | 0.3 | 1.50 (100) | 0.4 | 1.50 (100) | 0.5 | 1.50 (100) |
| 2 | 0.1 | 1.70 (100) | 0.2 | 1.70 (100) | 0.3 | 1.70 (100) | 0.4 | 1.70 (100) | 0.5 | 1.70 (96) |
| 3 | 0.1 | 1.90 (100) | 0.2 | 1.90 (100) | 0.3 | 1.84 (97) | 0.4 | 1.82 (96) | 0.5 | 1.79 (94) |
| 4 | 0.1 | 2.0 (100) | 0.2 | 1.92 (96) | 0.3 | 1.84 (92) | 0.4 | 1.80 (90) | 0.5 | 1.76 (88) |
| 5 | 0.1 | 2.1 (100) | 0.2 | 1.95 (93) | 0.3 | 1.83 (87) | 0.4 | 1.74 (83) | 0.5 | 1.63 (78) |
| 6 | 0.1 | 2.2 (100) | 0.2 | 2.00 (93) | 0.3 | 1.83 (83) | 0.4 | 1.72 (78) | 0.5 | 1.63 (74) |

A: Bending Strain (%)
B: Jc ($\times 10^4$ A/cm$^2$)

The values in the parenthesis indicate the percentage (100%) of the Jc after the work process with respect to the Jc prior to the work process.

EXAMPLE 1

$Bi_2O_3$, PbO, $CaCO_3$, $SrCO_3$ and CuO were employed to prepare powder containing Bi, Pb, Sr, Ca and Cu in the composition ratio of 1.8:0.4:2.0:2.2:3.0. This powder was heat treated and crushed, to obtain powder mainly consisting of a 2212 phase and non-superconducting phases. The obtained powder was heated under decompression, and thereafter charged in a silver pipe of 12.5 mm in outer diameter and 8.5 mm in inner diameter. Then, the silver pipe charged with the powder was drawn to obtain a single-filamentary wire. 61 such single-filamentary wires were bundled and engaged in a silver pipe of 12.0 mm in outer diameter and 9.0 mm in inner diameter, and thereafter drawn and rolled to obtain a tape-shaped multifilamentary superconducting wire. The wire as obtained was subjected to primary sintering at 845° C. for 50 hours, and thereafter rolled. Thereafter the wire was further subjected to secondary sintering at 840° C. for 100 hours. The wire of 5 m in length as obtained exhibited a critical current density of 10,000 A/cm$^2$ in liquid nitrogen. No reduction of the critical current density was caused in this wire upon bending up to a bending strain factor of 0.5%. Further, this wire exhibited a thermal contraction rate of about 0.2% in cooling from the room temperature to 77 K.

72 (24 by 3 layers) such wires were spirally wound on a stainless steel spiral tube having an outer diameter $R_1$ of 19 mm$\phi$, a thickness $T_1$ of 0.3 mm, depth $D_1$ of grooves of 2 mm and a pitch $P_1$ of 4 mm as shown in FIG. 1 at winding pitch widths of 250 mm with winding directions reversed every layer, to prepare a superconducting cable conductor of 24.5 mm in outer diameter and 1.5 m in length. The obtained conductor exhibited a critical current of 650 A in a linear state. Then, PPLP tapes of 140 $\mu$m in thickness and 30 mm in width were spirally wound on the wire in 11 layers with winding pitch widths of 40 mm and gap spaces of 0.5 mm, as insulating materials. The gap defined by the first-layer tape was covered with the next-layer tape. At this time, the winding directions were reversed every layer. The employed PPLP exhibited a heat contraction rate of about 2% in cooling from the room temperature to 77 K. The insulated superconducting cable conductor exhibited a critical current of 660 A in a linear state. When insulating materials having a thermal contraction rate larger by about 10 times than that (0.2%) of a silver-coated Bi superconducting wire were employed, the critical current density was rather increased as compared with a state before insulating.

COMPARATIVE EXAMPLE 1

72 (24 by 3 layers) tape wires prepared similarly to Example 1 were spirally wound on a stainless steel spiral tube having an outer diameter $R_1$ of 19 mm$\phi$, a thickness $T_1$ of 0.3 mm, depth $D_1$ of grooves of 2 mm and a pitch $P_1$ of 4 mm as shown in FIG. 1 at winding pitch widths of 250 mm with winding directions reversed every layer, to prepare a superconducting conductor of 24.5 mm in outer diameter and 1.5 m in length. The obtained conductor exhibited a critical current of 650 A in a linear state. Then, 40 layers of Kapton tapes (polyimide based tapes) of 50 $\mu$m in thickness and 30 mm in width were spirally wound on the conductor at winding pitch widths of 40 mm and gap spaces of 0.5 mm as insulating materials. The winding directions were reversed every layer. The Kapton tapes exhibited a thermal contraction rate of about 0.5% in cooling from the room temperature to 77 K. The insulated superconducting cable conductor exhibited a critical current of 630 A in a linear state. Thus, the critical current of the insulated superconducting cable conductor was reduced by about 3% as compared with that before insulation.

EXAMPLE 2

72 (24 by 3 layers) tape wires prepared similarly to Example 1 were spirally wound on an FRP bellows tube having an outer diameter $R_2$ of 19 mm$\phi$, a thickness $T_2$ of 0.3 mm, depth $D_2$ of grooves of 2 mm and a pitch $P_2$ of 4 mm as shown in FIG. 2 at winding pitch widths of 250 mm with winding directions reversed every layer, to prepare a superconducting cable conductor of 24.5 mm in outer diameter and 1.5 m in length. The obtained conductor exhibited a critical current of 700 A in a linear state. Then, PPLP tapes of 140 $\mu$m in thickness and 30 mm in width were spirally wound on the conductor in 11 layers with winding pitch widths of 40 mm and gap spaces of 0.5 mm, as insulating materials. At this time, the winding directions were reversed every layer. The PPLP exhibited a thermal contraction rate of about 2% in cooling from the room temperature to 77 K. The insulated superconducting cable conductor exhibited a critical current of 700 A in a linear state. Thus, no reduction of the critical current was recognized as compared with that before insulation.

COMPARATIVE EXAMPLE 2

72 (24 by 3 layers) tape wires prepared similarly to Example 1 were spirally wound on an FRP bellows tube having an outer diameter $R_2$ of 19 mm$\phi$, a thickness $T_2$ of 0.3 mm, depth $D_2$ of grooves of 2 mm and a pitch $P_2$ of 4 mm as shown in FIG. 2 at winding pitch widths of 250 mm with winding directions reversed every layer, to prepare a superconducting cable conductor of 24.5 mm in outer diameter and 1.5 m in length. The obtained conductor exhibited a critical current of 700 A in a linear state. Then, Kapton tapes of 50 $\mu$m in thickness and 30 mm in width were spirally wound on the conductor in 40 layers with winding pitch widths of 40 mm and gap spaces of 0.5 mm, as insulating materials. At this time, the winding directions were reversed every layer. The Kapton tapes exhibited a thermal contraction rate of about 0.5% in cooling from the room temperature to 77 K. The insulated conductor exhibited a critical current of 660 A in a linear state. Thus, the critical current was reduced by about 5% as compared with that before insulation.

EXAMPLE 3

72 (24 by 3 layers) wires prepared similarly to Example 1 were spirally wound on a stainless steel spiral tube having an outer diameter $R_1$ of 19 mm$\phi$, a thickness $T_1$ of 0.3 mm, depth $D_1$ of grooves of 2 mm and a pitch $P_1$ of 4 mm as shown in FIG. 1 at winding pitch widths of 250 mm with winding directions reversed every layer, to prepare a superconducting cable conductor of 24.5 mm in outer diameter and 1.5 m in length. The obtained conductor exhibited a critical current of 700 A in a linear state. Then, craft paper members of 50 $\mu$m in thickness and 30 mm in width were spirally wound on the conductor in 11 layers with winding pitch widths of 40 mm and gap spaces of 0.5 mm, as insulating materials. At this time, the winding directions of the craft paper members were reversed every layer. The craft paper exhibited a thermal contraction rate of about 2% in cooling from the room temperature to 77 K. The insulated conductor exhibited a critical current of 710 A in a linear state. Thus, the critical current density of the conductor was rather increased as compared with that before insulation.

EXAMPLE 4

Bending tests and bending cycle tests were carried out on the insulated superconducting cable conductor prepared in Examples 1 to 3. In every wire, no remarkable reduction of the critical current was recognized up to a bending diameter of 2.5 m. Also after bending at a bending diameter of 2.5 m was repeated 100 times, no remarkable reduction of the critical current was recognized in every wire. Thus, it has been understood that a spiral or bellows tube is effective for supplying flexibility to the insulated superconducting cable conductor.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An insulated superconducting cable conductor having a plurality of tape-shaped multifilamentary oxide superconducting wires, said insulated superconducting cable conductor comprising:

an elongated former having flexibility;

said plurality of tape-shaped multifilamentary oxide superconducting wires being spirally wound on said former at a bending strain factor in a prescribed range; and a tape-shaped insulating material being spirally wound on said multifilamentary superconducting wires;

said multifilamentary superconducting wires being superposed in layers on said former, whereby stabilizing materials of superposed said superconducting wires are in contact with each other;

said tape-shaped insulating material consisting essentially of a material being contracted at a thermal contraction rate of at least three times that of said multifilamentary superconducting wires by cooling from room temperature to liquid nitrogen temperature, whereby said tape-shaped insulating material can apply a pressure to superposed said multifilamentary superconducting wires from said tape-shaped insulating material toward said former by cooling in employment so that electrical contact between superposed said multifilamentary superconducting wires can be improved by cooling in employment wherein said insulated superconducting cable conductor is for dc use;

wherein said tape-shaped insulating material consists essentially of a material being contracted at a thermal contraction rate of at least 10 times that of said multifilamentary superconducting wires by cooling from a temperature of 298 K to that of 77 K.

2. An insulated superconducting cable conductor having a plurality of tape-shaped multifilamentary oxide superconducting wires, said insulated superconducting cable conductor comprising:

an elongated former having flexibility;

said plurality of tape-shaped multifilamentary oxide superconducting wires being spirally wound on said former at a bending strain factor of not more than 0.5%; and a tape-shaped insulating material being spirally wound on said multifilamentary superconducting wires with tension in a range from 0.5 to 2 kgf, said multifilamentary superconducting wires being superposed in layers on said former, whereby stabilizing materials of superposed said superconducting wires are in contact with each other, said tape-shaped insulating material consisting essentially of a material being contracted at a thermal contraction rate of at least three times that of said multifilamentary superconducting wires by cooling from a temperature of 298 K to that of 77 K, whereby said tape-shaped insulating material can apply a pressure to superposed said multifilamentary superconducting wires from said tape-shaped insulating material toward said former by cooling in employment so that electrical contact between superposed said multifilamentary superconducting wires can be improved by cooling in employment wherein said insulated superconducting cable conductor is for dc use.

3. The insulated superconducting cable conductor in accordance with claim 2, wherein filaments of said tape-shaped multifilamentary oxide superconducting wires have substantially homogeneous superconducting phase longitudinally along said superconducting wire, c-axes of said superconducting phase are oriented substantially in parallel with thickness directions of said tape-shaped superconducting wires, crystal grains in said filaments are in the form of flakes extending longitudinally along said superconducting wire, and said crystal grains are bonded with each other.

4. The insulated superconducting cable conductor in accordance with claim 2, wherein said stabilizing materials of said tape-shaped multifilamentary oxide superconducting wires consist essentially of silver or a silver alloy.

5. The insulated superconducting cable conductor in accordance with claim 4, wherein filaments of said tape-shaped multifilamentary oxide superconducting wires consist essentially of a bismuth based oxide superconducting material.

6. The insulated superconducting cable conductor in accordance with claim 2, wherein each said tape-shaped multifilamentary oxide superconducting wire has at least 37 filaments.

7. The insulated superconducting cable conductor in accordance with claim 2, wherein said tape-shaped insulating material consists essentially of at least one material selected from the group consisting of polyethylene, polypropylene laminate paper, and paper.

8. The insulated superconducting cable conductor in accordance with claim 2, wherein said former is a tubular member having flexibility.

9. The insulated superconducting cable conductor in accordance with claim 2, wherein said tape-shaped insulating material consists essentially of a material being contracted at a thermal contraction rate of at least 10 times that of said multifilamentary superconducting wires by cooling from a temperature of 298 K to that of 77 K.

* * * * *

UNITED STATES PATENT AND TRADEMARK OFFICE
CERTIFICATE OF CORRECTION

PATENT NO.   : 6,313,408 B1
DATED        : November 6, 2001
INVENTOR(S)  : Jun Fujikami, Kenichi Sato, Tsukushi Hara and Hideo Ishii It is certified that error appears in the above-identified patent and that said Letters Patent is hereby corrected as shown below:

<u>Title page,</u>
Item [73], Assignee, change "Sumitomo Electric Indusstries, Inc." to -- Sumitomo Electric Industries, Ltd. --

Signed and Sealed this

First Day of October, 2002

*Attest:*

JAMES E. ROGAN
*Attesting Officer*   *Director of the United States Patent and Trademark Office*